(Specimens.)
J. C. WISWELL.
SOLUTION FOR USE IN SEPARATING METALS FROM THEIR ORES.
No. 410,228. Patented Sept. 3, 1889.
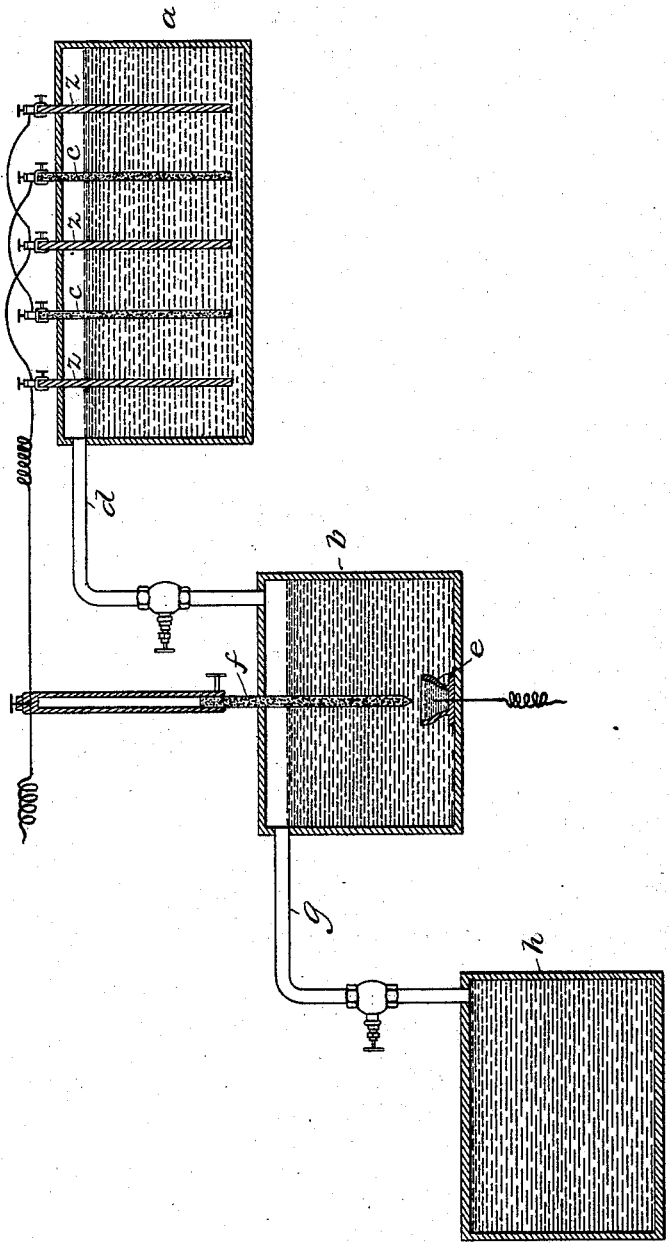

UNITED STATES PATENT OFFICE.

JACOB C. WISWELL, OF MEDFORD, MASSACHUSETTS, ASSIGNOR TO THE ELECTRIC GOLD AND SILVER CHLORINATION COMPANY, OF KITTERY, MAINE.

SOLUTION FOR USE IN SEPARATING METALS FROM THEIR ORES.

SPECIFICATION forming part of Letters Patent No. 410,228, dated September 3, 1889.

Application filed November 3, 1888. Serial No. 289,919. (Specimens.)

*To all whom it may concern:*

Be it known that I, JACOB C. WISWELL, of Medford, in the county of Middlesex and State of Massachusetts, have invented certain new and useful Improvements in Solutions for Use in Separating Metals from their Ores, of which the following is a specification.

It is the object of my invention to produce an improved bath or solution for use in separating precious metals from the ores in which they may be embedded.

To this end my invention consists in the improved bath or solution which I will now proceed to describe and claim, reference being had to the accompanying drawing, forming a part of this specification, the figure in said drawing representing a sectional view of an apparatus which may be used in the production of my new bath or solution.

In the generation or composition of the above-named bath or solution the mode of procedure may be set forth as follows: A quantity of salt-water, to which muriate of ammonia and muriatic or sulphuric or other acid in suitable quantities have previously been added, is placed in a tank $a$, termed by me a "chlorine-generator," which tank may be constructed of wood or other suitable material, and the solution so prepared is subjected to a current of electricity by means of a series of zinc plates $z$ and carbon plates $c$, so arranged in the chlorine-generator as to send a continuous current of electricity through the fluid or solution, the carbon plates $c$ serving as the anode or positive pole of an electric excitant, and the zinc plates $z$ as the cathode or negative pole. The action of the electric current upon the elements comprising the solution in this tank $a$ results in the generation of aqua-chlorine possessing great activity, which chlorine is held by the liquor ready for the next operation or step in the process—viz., the generation of a salt of mercury, which is simultaneously dissolved, and may be carried on in a tank $b$. The fluid or solution after treatment in the chlorine-generator $a$ is conveyed to the generator $b$ through the pipe $d$, or in any other convenient or suitable way. In the bottom of the generator $b$, I arrange a suitable vessel $e$, containing a quantity of liquid mercury, and connect the positive pole of an electric excitant with the liquid mercury in the vessel $e$, suspending a carbon plate $f$ over and near the cup or vessel $e$, to which plate I connect a negative electrode, when I subject the solution in the tank $b$ to a current of electricity by the means explained, with the result of rapidly generating a soluble mercury salt, which will be dissolved in the solution, and in this condition may be conveyed through the pipe $g$ or by other suitable means to the storage-tank $h$.

The solution or bath, substantially as hereinbefore set forth, may be employed, by proper manipulation, in various processes of freeing precious metals from the several gangues in which they may be embedded, the solution operating in a very speedy and effectual manner.

Having thus described my invention, what I claim is—

The herein-described solution or bath for use in separating metals from their ores, consisting of chlorine in solution, sodium chloride, ammonium chloride, hydrochloric acid, and bichloride of mercury, as set forth.

In testimony whereof I have signed my name to this specification, in the presence of two subscribing witnesses, this 31st day of October, A. D. 1888.

JACOB C. WISWELL.

Witnesses:
ARTHUR W. CROSSLEY,
A. D. HARRISON.